US008954436B2

(12) United States Patent
Chitiveli et al.

(10) Patent No.: US 8,954,436 B2
(45) Date of Patent: Feb. 10, 2015

(54) MONITORING CONTENT REPOSITORIES, IDENTIFYING MISCLASSIFIED CONTENT OBJECTS, AND SUGGESTING RECLASSIFICATION

(75) Inventors: Srinivas V. Chitiveli, Karnataka (IN); Barton W. Emanuel, Manassas, VA (US); Josemina M. Magdalen, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/358,738

(22) Filed: Jan. 26, 2012

(65) Prior Publication Data
US 2013/0198193 A1    Aug. 1, 2013

(51) Int. Cl.
G06F 7/00    (2006.01)
G06F 17/30    (2006.01)

(52) U.S. Cl.
USPC .......................................................... 707/737

(58) Field of Classification Search
CPC ................. G06F 17/3071; G06F 17/30707
USPC ........................................... 707/737, 999.001
See application file for complete search history.

(56) References Cited

U.S. PATENT DOCUMENTS

| | | | | |
|---|---|---|---|---|
| 5,930,788 | A * | 7/1999 | Wical | 1/1 |
| 6,233,575 | B1 * | 5/2001 | Agrawal et al. | 1/1 |
| 6,592,627 | B1 * | 7/2003 | Agrawal et al. | 715/234 |
| 7,698,335 | B1 * | 4/2010 | Vronay | 707/737 |
| 7,849,049 | B2 | 12/2010 | Langseth et al. | |
| 2005/0246311 | A1 | 11/2005 | Whelan et al. | |
| 2006/0015509 | A1 | 1/2006 | Naitou | |
| 2006/0242147 | A1 * | 10/2006 | Gehrking et al. | 707/7 |
| 2008/0086433 | A1 * | 4/2008 | Schmidtler et al. | 706/12 |
| 2008/0201722 | A1 | 8/2008 | Sarathy | |
| 2009/0094178 | A1 * | 4/2009 | Aoki | 706/20 |
| 2009/0307695 | A1 | 12/2009 | Chandnani | |

FOREIGN PATENT DOCUMENTS

| | | | |
|---|---|---|---|
| KR | 20080093605 A | 10/2008 | |
| WO | 2010020296 A1 | 2/2010 | |

OTHER PUBLICATIONS

Preliminary Remarks, Apr. 18, 2012, for U.S. Appl. No. 13/444,692, filed Apr. 11, 2012 by S.V. Chitiveli et al., Total 1 p. (57.251C1 (PrelimRemarks)].

(Continued)

*Primary Examiner* — Aleksandr Kerzhner
(74) *Attorney, Agent, or Firm* — Janaki K. Davda; Konrad, Raynes, Davda & Victor LLP

(57) ABSTRACT

Provided are a computer implemented method, computer program product, and system for organizing content objects in an enterprise content management system. Auditing of the content objects is performed to identify one or more content objects that are to be re-classified. A content object is selected. A first category associated with the content object is obtained. A relevancy score is obtained for the first category. A list of candidate categories and relevancy scores for each of the candidate categories are obtained. In response to determining that the first category does not correspond to a candidate category or that the relevancy score does not exceed a threshold, the content object is identified as improperly categorized, and the candidate categories that have associated relevancy scores that exceed the threshold are provided in an audit report.

14 Claims, 10 Drawing Sheets

(56) References Cited

OTHER PUBLICATIONS

U.S. Appl. No. 13/444,692, filed Apr. 11, 2012, entitled "Monitoring Content Repositories, Identifying Misclassified Content Objects, and Suggesting Reclassification", invented by Chitiveli, S.V., B.W. Emanuel, and J.M. Magdalen, Total 34 pp. [57.251C1 (Appln)].

English Abstract for KR20080093605A, published Oct. 22, 2008, Total 1 p.

Chieu, T.C., L. Zeng, and A. Mohindra, "An Extensible Enterprise Content Management System with Service Component Architecture", IEEE International Conference on Service Operations & Logistics & Informatics (SOLI'08), 2008, Total 7 pp. [pp. 1131-1137].

Chieu, T.C. and L. Zeng, "Service-Oriented Approach for Implementing an Extensible Content Management System", IEEE Congress on Services Part 2 (Services-2), 2008, Total 8 pp. [pp. 96-103].

Fisher, M. and A. Sheth, "Semantic Enterprise Content Management", Practical Handbook of Internet Computing, CRC Press, www.mendeley.com, 2004, Total 25 pp.

JKCS Inc., "Document Management Systems", [online], Jun. 9, 2011. Retrieved from the Internet at <URL: http://jkremer.com/White%20Papers/Document%20Management%20Systems%20White%20Paper%20JKCS.pdf, Total 43 pp.

Zhu, W., S. Barron, M. Gallotti, V. Gupta, X. Wang, J. Magdalen, and J. Singer, "IBM Classification Module: Make it Work for you", © International Business Machines Corporation 2009, First Edition (Oct. 2009), Total 472 pp.

Office Action 1 for U.S. Appl. No. 13/444,692, dated Sep. 3, 2013, 17 pp. [57.251C1 (OA1)].

International Search Report & Written Opinion, Jun. 27, 2013, for PCT/IB2013/050600, Total 10 pp.

Response to Office Action 1, filed Dec. 3, 2013, for U.S. Appl. No. 13/444,692, 6 pp. [57.251C1 (ROA1)].

Final Office Action 1, Jan. 15, 2014, for U.S. Appl. No. 13/444,692, filed Apr. 11, 2012 by S.V. Chitiveli et al., Total 14 pp. [FOA1 (57.251C1)].

Response to Final Office Action 1, Apr. 15, 2014, for U.S. Appl. No. 13/444,692, filed Apr. 11, 2012 by S.V. Chitiveli et al., Total 6 pp. [RspFOA1 (57.251C1)].

Supplemental Amendment 3, Aug. 5, 2014, for U.S. Appl. No. 13/444,692, filed Apr. 11, 2012 by S.V. Chitiveli et al., Total 6 pp. [57.251C1 (SuppAmend3)].

Office Action 3, Apr. 23, 2014, for U.S. Appl. No. 13/444,692, filed Apr. 11, 2012 by S.V. Chitiveli et al., Total 14 pp. [57.251C1 (OA3)].

Response to Office Action 3, Jul. 23, 2014, for U.S. Appl. No. 13/444,692, filed Apr. 11, 2012 by S.V. Chitiveli et al., Total 8 pp. [57.251C1 (ROA3)].

Notice of Allowance 1, Sep. 25, 2014, for U.S. Appl. No. 13/444,692, filed on Apr. 11, 2012 by S.V. Chitiveli et al., Total 12 pages.

\* cited by examiner

MONITORING CONTENT REPOSITORIES, IDENTIFYING MISCLASSIFIED CONTENT OBJECTS, AND SUGGESTING RECLASSIFICATION

FIELD

Embodiments of the invention relate to monitoring content repositories, identifying misclassified content objects in the content repositories, and suggesting reclassification of the content objects.

BACKGROUND

To counter the exponential growth of data, organizations are leveraging Enterprise Content Management (ECM) content repositories to archive the data that holds value and reduce costs to their running businesses. For example, emails are archived in the ECM content repositories to move the disk storage demands from the email servers to the ECM content repositories. As part of this archival process, emails of high business value are identified and suitable record policies are applied (e.g., an email from a CEO about an acquisition is flagged with a hold policy for 10 years). In addition to emails, ECM content repositories are leveraged to store and access data from collaborative enterprise file shares or various servers. Leveraging ECM content repositories to maintain data from email servers, other servers, file shares, case management applications, etc., creates a problem of organizing the data for easy and quick discovery. The problem magnifies as the data from the above mentioned silos is most often unstructured (e.g., text documents or files, presentations, spreadsheets, videos, audio, etc.) with very basic native metadata (e.g., author, time of creation, location, file name, size).

ECM content repositories rely on metadata, including categorization or taxonomy metadata, to provide an organizing structure for content, such as documents, and to make the documents easy for humans to find, whether by search of the metadata or by browsing of a taxonomy tree or category tree. The categorization and taxonomy metadata may be described as information that places content in a category or classification. This metadata is normally assigned or "attached" to a document at the time the document is ingested (i.e., processed by the ECM), placed in a content repository, or at a time when the document is moved from one logical location (e.g., a folder) in a content repository to another logical location. An content item may be located in more than one folder, but the content item is really stored in the content repository once, and the folder is metadata associated with that content item. For humans, though, it is a way to navigate through the repository and find things by browsing, and to organize like content items.

A variety of techniques may be used to assign or attach the metadata. Some metadata may be learned automatically from the document itself, based on document properties. Other metadata may be derived, manually (by humans), or automatically (by systems which analyze text), based on the content of the document. Still other metadata may be assigned either automatically or manually based on external factors.

When metadata is assigned manually, errors may occur, which results in improperly filed or categorized documents. These errors and omissions can occur for a variety of reasons, such as: humans not wanting to perform the additional task of assigning metadata, humans being inconsistent on a judgment call, and improper training for users.

Additionally, as all systems change over time, documents which were originally assigned to one category might be better placed at a later date in a different category, due to additions to the system, changes, and general "drift" of the data model used for representing metadata.

Enterprises may employ a variety of techniques to ensure compliance for metadata standards and proper assignment of metadata. For application-level enforcement, the application requires metadata to be selected, assigned, or entered for a document before the document can be submitted to a repository, but the user selecting the metadata may select any valid value or set of values, which may not be accurate. For workflow-level enforcement, a workflow is invoked to perform a "check" or "quality control" of metadata assignment, and this relies on humans accurately assigning metadata. For automatic assignment based on technology, humans are not involved in categorizing the documents or assigning the metadata, but drift may still occur.

SUMMARY

Provided are a computer implemented method, computer program product, and system for organizing content objects in an enterprise content management system. Auditing of the content objects is performed to identify one or more content objects that are to be re-classified. A content object is selected. A first category associated with the content object is obtained. A list of candidate categories and relevancy scores for each of the candidate categories are obtained. It is determined whether the first category corresponds to a candidate category in the list of candidate categories. In response to determining that the first category corresponds to a candidate category, it is determined whether a relevancy score associated with the first category exceeds a threshold. In response to determining that the relevancy score exceeds the threshold, the content object is identified as properly categorized. In response to determining that the first category does not correspond to the candidate category or that the relevancy score does not exceed the threshold, the content object is identified as improperly categorized, and the candidate categories that have associated relevancy scores that exceed the threshold are provided in an audit report.

BRIEF DESCRIPTION OF THE SEVERAL VIEWS OF THE DRAWINGS

In the drawings, like reference numbers represent corresponding parts throughout.

FIG. 3 is formed by FIGS. 3A, 3B, 3C, and 3D.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
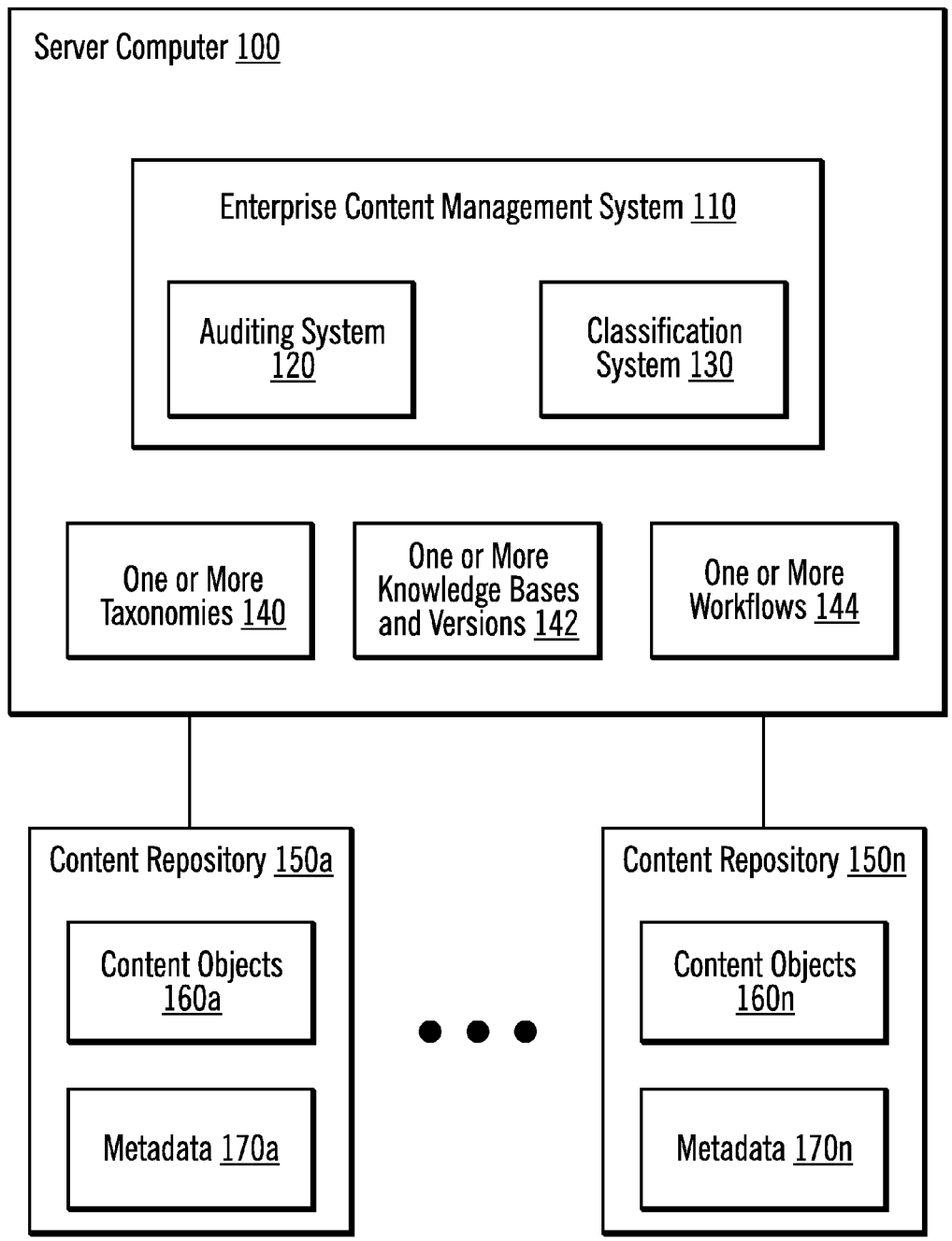
FIG. 1 illustrates, in a block diagram, a computing environment in accordance with certain embodiments.

FIG. 1 illustrates, in a block diagram, a computing environment in accordance with certain embodiments. A server computer 100 is coupled to an Enterprise Content Management System (ECMS) 110. The ECMS 110 includes an auditing system 120 and a classification system 130. The server computer 100 also stores one or more taxonomies 140, one or more knowledge bases 142 and their versions, and one or more workflows. In certain embodiments, the functionality of the auditing system 120 and the classification system 130 may be combined into one system.

The server computer 100 is coupled to one or more content repositories 150a . . . 150n. Each of the content repositories 150a . . . 150n stores content objects 160a . . . 160n and metadata 170a . . . 170n. Content objects 160a . . . 160n may include, for example, text documents, text files, presentations, spreadsheets, videos, audio, images, videos, Portable Data Format (PDF) documents, any other objects having associated text, etc. That is, the content objects 160a . . . 160n represent any kind of data that may be managed by the ECMS 110. The metadata 170a . . . 170n may be said to be assigned to or attached to the content objects 160a . . . 160n 160a . . . 160n. The metadata 170a . . . 170n may include author, title, subject, time of creation, location, file name, size, etc.

The auditing system 120 and the classification system 130 work together to allow the content objects 160a . . . 160n being stored, maintained, and accessed to be organized for quick and easy discovery. The auditing system 120 also provides an audit mechanism for monitoring the content repositories 150a . . . 150n to identify misclassified content objects 160a . . . 160n 160a . . . 160n and suggest reclassification and reorganization.

In particular, the auditing system 120 uses statistical and rule-based classifiers to audit the content repositories 150a . . . 150n of the ECMS 110.

A statistical classifier uses statistics (e.g., word frequencies within a content object 160a . . . 160n compared to the frequency of the same word within the entire corpus) to build a statistical profile for a content object 160a . . . 160n, then the statistical classifier uses those statistics to put the content object 160a . . . 160n into a category. Typically, a statistical classifier can be trained by providing sample content objects 160a . . . 160n for each category, and having the statistical classifier figure out which words in the content objects 160a . . . 160n make the content object 160a . . . 160n part of the category, which words don't make the content object 160a . . . 160n part of the category, etc. The statistical classifier then creates a statistical profile for each category. New content objects 160a . . . 160n are then run through the statistical techniques to produce a content object 160a . . . 160n profile, and the content object 160a . . . 160n profile is compared to the category profiles to see which categories are the "best" matches for the content object 160a . . . 160n. In doing so, the statistical classifier may calculate a relevancy score (also referred to as a confidence score) for each category and for each content object 160a . . . 160n. Depending on the application, the highest scoring category may be chosen and assigned to the content object 160a . . . 160n, several high-scoring categories may be assigned, or, in some cases, no category is assigned if the score is below some predetermined threshold.

A rule-based classifier, on the other hand, uses rules (e.g., "If the title contains 'foo' and the body contains 'bar' then put this content object 160a . . . 160n in the 'foobar' category) to classify content objects 160a . . . 160n into categories.

The auditing system 120 determines which content objects 160a . . . 160n are improperly filed, classified, or categorized, and suggests actions to be taken to correct errors, omissions, and anomalies. Suggestive actions include, for example: enhancing the metadata of the content objects, assigning a related content object 160a . . . 160n class to the content object 160a . . . 160n or even moving the content object 160a . . . 160n to an associated folder. By performing periodic automated audits, the auditing system 120 ensures that content objects 160a . . . 160n are properly placed into categories so that they are easier to find.

Figure 2:
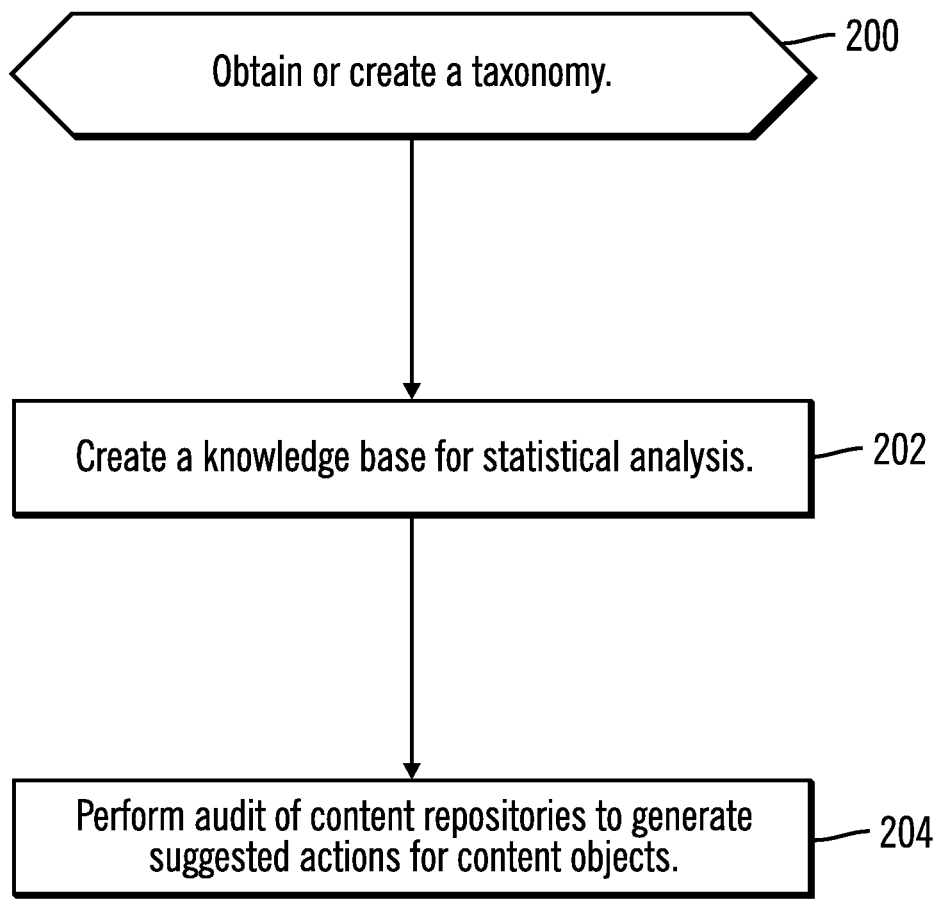
FIG. 2 illustrates, in a flow diagram, operations for organizing content objects in an enterprise content management system in accordance with certain embodiments.

FIG. 2 illustrates, in a flow diagram, operations for organizing content objects 160a . . . 160n in an enterprise content management system in accordance with certain embodiments. Control begins at block 200 with the classification system 130 obtaining or creating a taxonomy 140. The taxonomy 140 may be described as a list of categories. In certain embodiments, the taxonomy 140 is created by humans (and obtained by the classification system 130) or is created by the classification system 130 with human input.

In block 202, the classification system 130 creates a knowledge base 142 for statistical analysis. The knowledge base 142 may be described as statistics and other information associated with the taxonomy 140, which allows the statistical classifier to perform classification.

The taxonomy 140 is used to identify the context of the content object 160a . . . 160n and provide a relevancy score. A relevancy score may be described as a measure of how strong a candidate a content object 160a . . . 160n is for a category. For example, if a content object 160a . . . 160n scores 77 in Category A and 65 in Category B, the content object 160a . . . 160n is more likely to be put into Category A.

As another example, the statistical analysis on a content object 160a . . . 160n results in a list of categories (HR/Finance/Engineering) with a relevancy score for each category and each content object 160a . . . 160n that represents how closely related the category is to that content object 160a . . . 160n. The statistical analysis works by identifying the most frequently used elements (e.g., words) in the content object 160a . . . 160n, which are elements with high weights (e.g., words in the title, words in bold lettering, words that are highlighted etc.) and comparing these elements/words to the elements/words in the category profile.

The taxonomy 140 may be created from a known set of sample content objects. For example, 20 content objects 160a . . . 160n known to be related to HR, 20 content objects 160a . . . 160n known to be related to Finance, and 20 content objects 160a . . . 160n known to be related to Engineering may be provided and used by the classification system 130 to create a taxonomy 140 that identifies content objects 160a . . . 160n related to the HR/Finance/Engineering categories.

In embodiments in which sample content objects 160a . . . 160n are available, the classification system 130 crawls each content repository 150a . . . 150n to build category profiles, and then generates relevancy scores for categories with reference to content objects 160a . . . 160n using the discovered category profiles. The relevancy scores describe how closely related each category is to each content object 160a . . . 160n or vice versa.

In certain embodiments in which sample content objects 160a . . . 160n are not available, the classification system 130 applies clustering algorithms to generate the category profiles. The classification system 130 identifies content objects 160a ... 160n scoring below a predetermined threshold as possible candidates for suggestive actions (e.g., reclassification, reassignment, or refiling). In certain embodiments, this is done on a continuous basis for categories. Content objects 160a ... 160n scoring above the predetermined threshold may be subjected to one or more of the suggestive actions.

That is, there may be situations where a known sample corpus of content objects 160a ... 160n is not available. In such scenarios, the classification system 130 may apply clustering algorithms to a large set of content objects 160a ... 160n to group content objects 160a ... 160n by the common elements (e.g., words) across them. This technique helps to create accurate taxonomies.

To gather content objects, the classification system 130 has a scheduled crawler that reads through a configurable number of the content objects 160a ... 160n (e.g., some or all of the content objects) in the content repositories 150a ... 150n. The classification system 130 clusters the content objects 160a ... 160n with common elements. Each cluster may represent a category in the resulting baseline taxonomy 140. This baseline taxonomy 140 may be used to reorganize the data in the content repositories 150a ... 150n.

If clustering is not suitable, the auditing system 120 may build a knowledge base 142 based on the structure of the content repositories 150a ... 150n:

1. Iterate through each content repository 150a ... 150n beginning with the root folder or top of the content repository 150a ... 150n.
2. For the current node, start a new empty category in the current knowledge base 142 (i.e., the knowledge base version 142 that is running).
3. Obtain a list of content objects 160a ... 160n or nodes (i.e., folders).
4. For each content item (i.e., content object 160a ... 160n or node) on the list:
   a. If the content item is a node or folder, go to process (2) above to start a new empty category in the current knowledge base 142.
   b. If the content item is a content object, send the content of the content object 160a ... 160n to the classification system 130 as feedback for the current category.

This provides a baseline knowledge base 142 based on the organizational structure of the content repositories 150a ... 150n. The knowledge base 142 may be described as storing the underlying statistical profiles for the taxonomy categories, as well as, other information used to perform classification.

In block 202, the auditing system 120 performs an audit of content repositories to generate suggested actions for content objects. To achieve quick discoverability and proper organization of a content object, the auditing system 120 audits a content repository 150a ... 150n and automatically detects misclassified content objects 160a ... 160n 160a ... 160n and misapplied metadata 170a ... 170n. Based on a configurable threshold, the auditing system 120 automatically categorizes or provides suggestions for categorizing each content object 160a ... 160n by: 1) enhancing the metadata of the content object, 2) moving the content object 160a ... 160n to a folder with content object 160a ... 160n of similar context, or 3) assigning the content object 160a ... 160n to a content object 160a ... 160n class that groups content objects 160a ... 160n of similar context.

FIG. 3 illustrates operations performed by the auditing system 120 in accordance with certain embodiments. The auditing system 120 monitors the content repositories 150a ... 150n and periodically attempts to locate content items to be re-classified. FIG. 3 is formed by FIGS. 3A, 3B, 3C, and 3D. Once a taxonomy 140 or knowledge base 142 is in place, the auditing system 120 applies the results of the taxonomy 140 or knowledge base 142 to help organize data in the content repositories 150a ... 150n. The auditing system 120 includes a scheduled crawler that reads through the content objects 160a ... 160n and reaches out to the classification system 130 (i.e., the associated taxonomy provider) to learn about the best category that represents the content object based on relevancy scores for each category for each content object 160a ... 160n. Based on the relevancy score, the crawled content object 160a ... 160n may be subjected to a suggestive action (which could be updating the metadata, assigning a content object 160a ... 160n class, moving the content object 160a ... 160n to a relevant folder, etc.).

If the content objects 160a ... 160n are not categorized because of a low relevancy score, the content objects 160a ... 160n are flagged for a manual audit process in which an ECMS administrator may manually organize the content objects.

In FIG. 3, control begins at block 300 with the auditing system 120 selecting a next node, starting with a first node. In certain embodiments, if there are no more nodes to process, the processing of FIG. 3 is done. A taxonomy tree or a category tree represents the taxonomy 140 or knowledge base 142 using nodes to represent folders, starting with a root folder. The auditing system 120 iterates through each content repository 150a ... 150n, beginning with the root node (i.e., top of the content repository 150a ... 150n). In block 302, for the selected node, the auditing system 120 determines the category associated with that node. In block 304, for the selected node, the auditing system 120 obtains a list of content objects 160a ... 160n and/or nodes within the selected node.

Figure 3A:
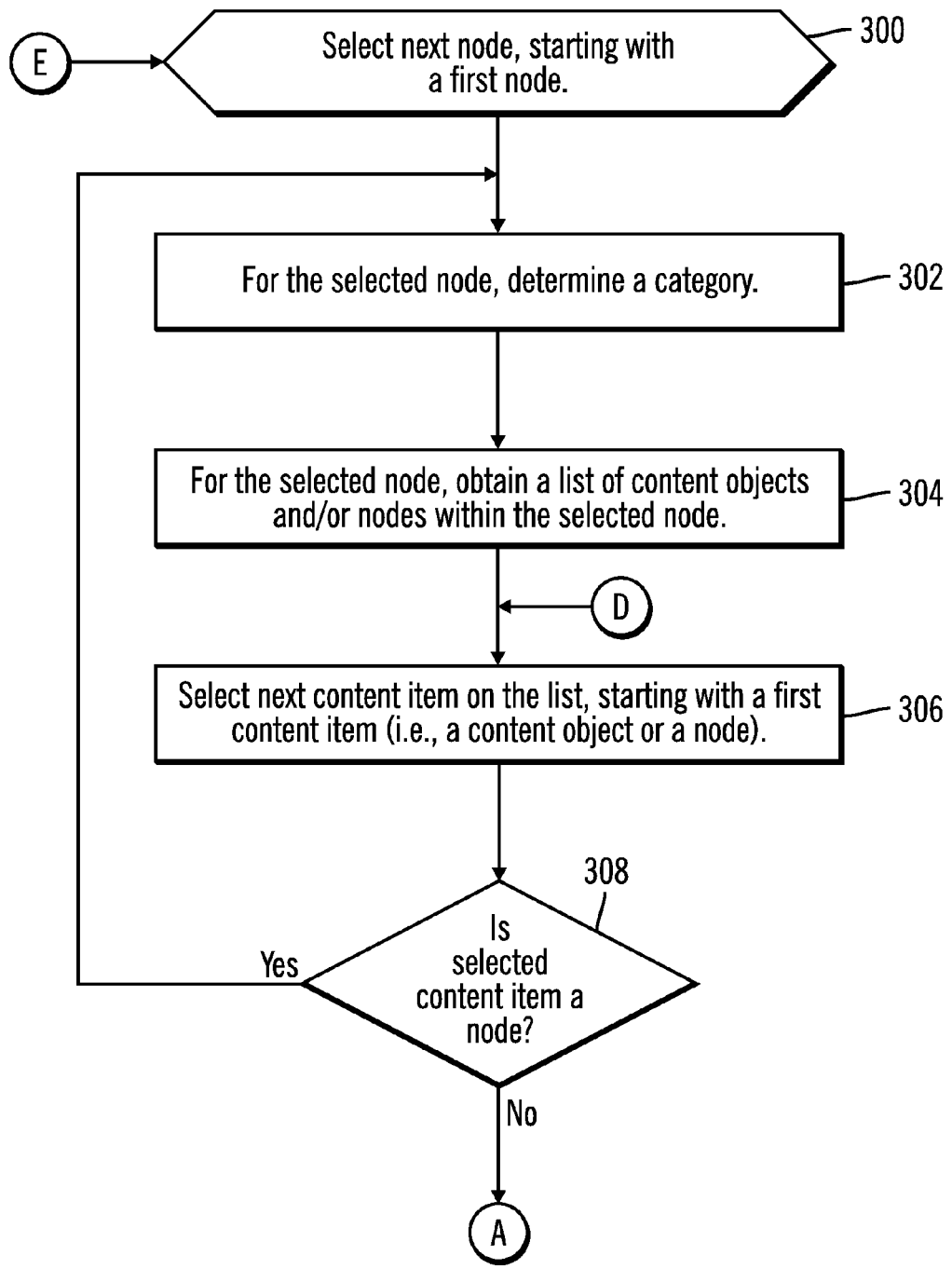
FIG. 3 illustrates operations performed by the auditing system 120 in accordance with certain embodiments.
Figure 3B:
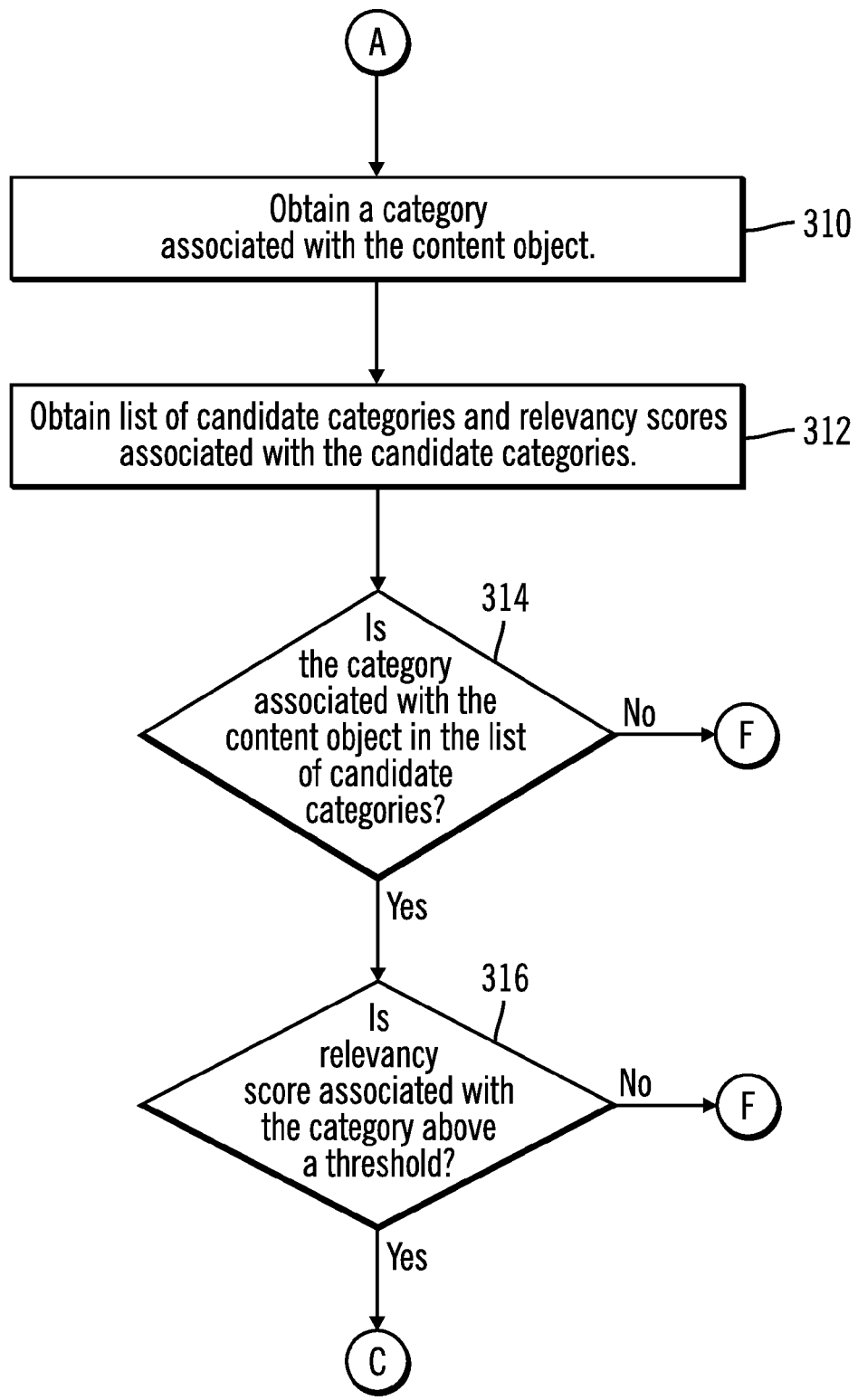
Figure 3C:
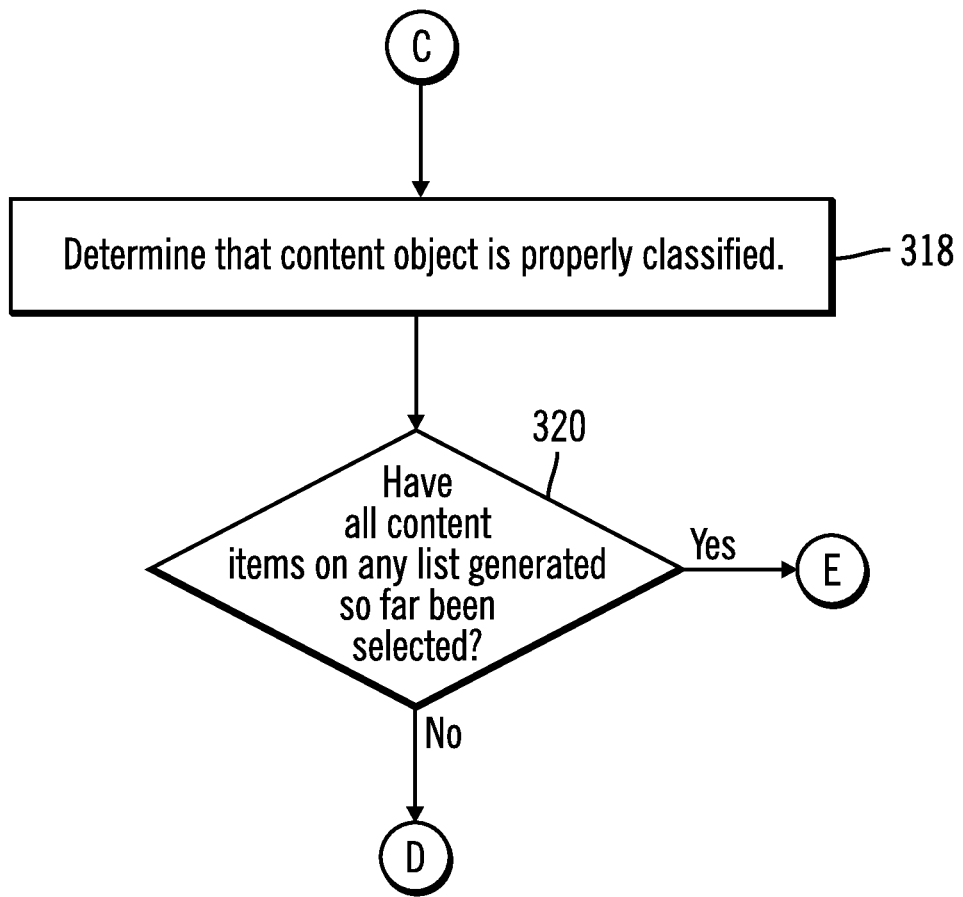

In block 306, the auditing system 120 selects the next content item on the list, starting with a first content item. Each content item is a content object 160a ... 160n or a node on the list. In block 308, the auditing system determines whether the selected content item is a node. If so, processing continues to block 302, otherwise, processing continues to block 310 (FIG. 3B).

In block 310, the auditing system 120 obtains a category associated with the content object. In block 312, the auditing system 120 obtains a list of candidate categories and relevancy scores associated with the candidate categories. In certain embodiments, the auditing system 120 obtains these from the classification system 130.

Figure 3D:
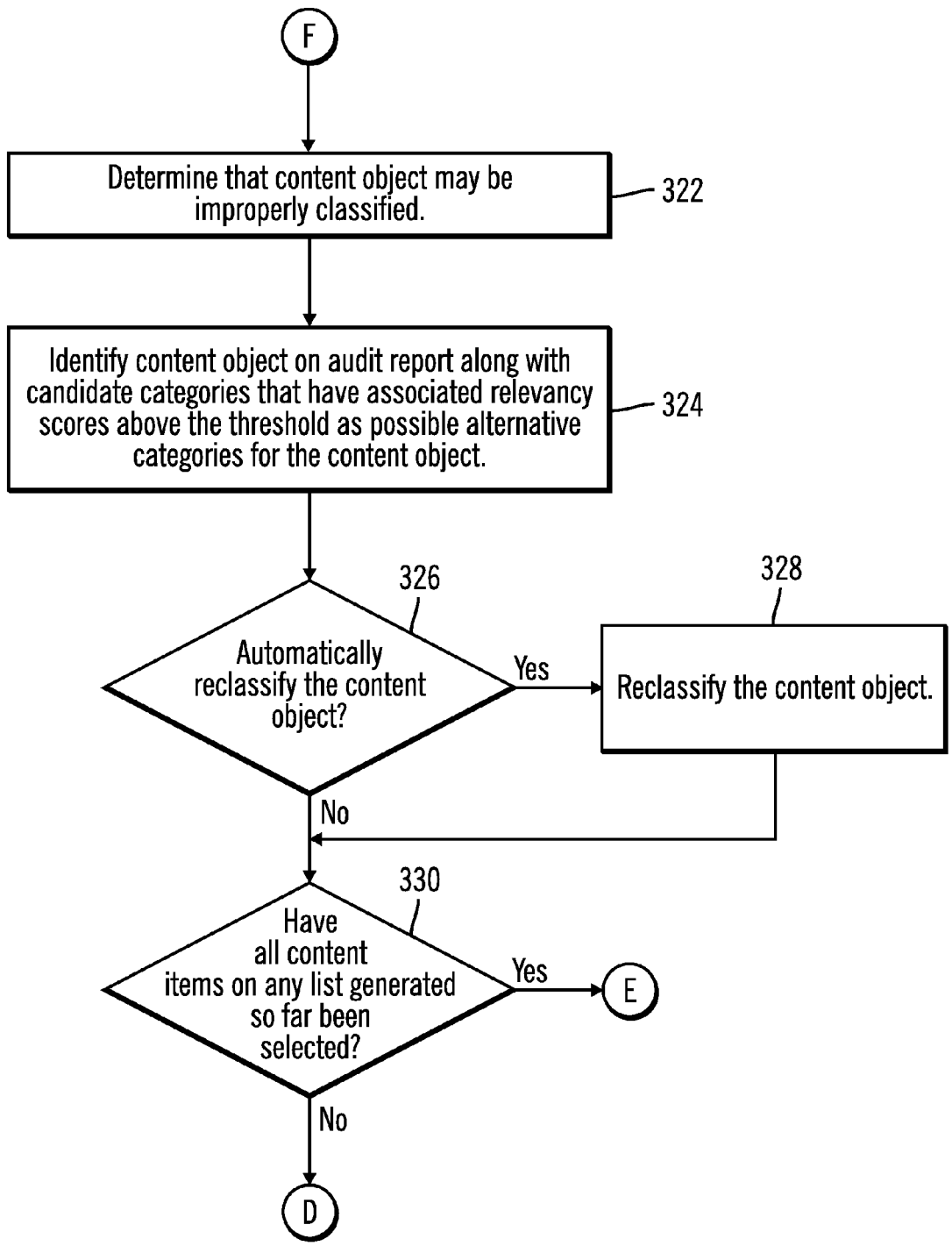

In block 314, the auditing system 120 determines whether the category associated with the content object 160a ... 160n is in the list of candidate categories. If so, processing continues to block 316, otherwise, processing continues to block 322 (FIG. 3D).

In block 316, the auditing system 120 determines whether a relevancy score associated with the category is above a threshold. In certain embodiments, that auditing system 120 identifies the relevancy score as the one associated with the candidate category (in the list of candidate categories) that matches the category associated with the content object 160a ... 160n. The threshold may be set by, for example, an administrator, or calculated based on some heuristic. If so, processing continues to block 318 (FIG. 3C), otherwise, processing continues to block 322 (FIG. 3D). In block 318, the auditing system 120 determines that the content object 160a ... 160n is properly classified.

In block 320, the auditing system 120 determines whether all content items on any list generated so far have been selected. If so, processing continues to block 300 to select another node, otherwise, processing continues to block 306, to select the next content item on a list. Because it is possible that a node includes anther node, which includes another node, etc., multiple lists may be recursively created and processed.

In block 322, the auditing system 120 determines that the content object 160a ... 160n may be improperly classified. In block 324, the auditing system 120 identifies the content object 160a ... 160n on an audit report along with candidate categories that have associated relevancy scores above the threshold. The candidate categories are provided as alternative categories for the content object.

In block 326, the auditing system 120 determines whether the content object 160a ... 160n is to be automatically classified. If so, processing continues to block 328, otherwise, processing continues to block, 330. In certain embodiments, a flag is associated with the content object 160a ... 160n and/or with a node. The flag may be set to indicate automatic reclassification of the content object 160a ... 160n.

In block 330, determines whether all content items on any list generated so far have been selected. If so, processing continues to block 300 to select another node, otherwise, processing continues to block 306, to select the next content item on a list.

In certain embodiments, the auditing system 120 processes other metadata fields. That is, the auditing system 120 treats other metadata fields as taxonomy categories. For example, if there is a field called retention period, "one week" and "three years" may be categories in the "retention period" taxonomy. The taxonomy becomes the collection of the assigned values in the "retention period" field. Then, the classification system 130 uses the content objects 160a ... 160n and their retention periods to train a knowledge base 142 for this taxonomy by training each category on the content objects 160a ... 160n assigned to that retention period. Then, the classification system 130 uses this knowledge base 142 to get the relevancy scores for each category and each content object 160a ... 160n and determines whether each content object 160a ... 160n really belongs to the retention period the content object 160a ... 160n was originally assigned to or whether adjustments should be made. In certain embodiments, these may be added during the initial knowledge base 142 building iteration of the repository, allocating a separate knowledge base 142 for each unique field, and a category for each unique value within the field. That is, if there are additional metadata fields, the classification system 130 may create a taxonomy 140 and knowledge base 142 for each of the additional metadata fields.

In certain embodiments, for the monitoring and auditing, the classification system 130 provides an additional mechanism to support monitoring the content repositories 150a ... 150n, identifying misclassified content objects, and suggesting when it is useful to reclassify the content objects.

In such embodiments, the periodic audit procedure may be enhanced using functionality called knowledge base 142 (or decision plan) versioning. In certain embodiments, the classification system 130 enables versions of the knowledge base 142 to be saved (e.g., all versions used for a certain deployment). When an administrator wants to understand or reproduce a certain decision provided by the knowledge base 142, given the exact knowledge base version 142, the administrator will be able to do so. The knowledge base versions 142 are updated if the knowledge base 142 changes (e.g., on a same or a different server).

One way to inspect the content repositories 150a ... 150n is implement the audit procedure described in FIG. 3 by running bulk classification of the content objects 160a ... 160n inside the respective content repositories 150a ... 150n or by reviewing subsets of the content objects 160a ... 160n. The classification system 130 stores the knowledge base versions 142 automatically, along with the regular classification results, in the ECMS 110 and presents these to a reviewer.

This feature is useful for the defensibility of the results when required, since the reviewer can prove why a certain decision (e.g., setting the retention date, assigning the record class, etc,) was taken. In addition, this functionality helps with more efficient and exact auditing.

In embodiments in which the knowledge base versions 142 are stored, the auditing system 120 performs modified processing of FIG. 3. In particular, the auditing system 120 looks for the previously stored classification results, extracts the knowledge base version 142, and checks if the current knowledge base version 142 is different from the knowledge base version 142 of the previously stored classification results. Then, the auditing system 120 checks only content objects 160a ... 160n whose classifications are associated with knowledge base versions 142 that are different from the current knowledge base version 142. This is useful when the content repository 150a ... 150n is read-only or when a workflow 144 did not have changes to the content objects 160a ... 160n.

With reference to FIG. 3, after the operations of block 312, the auditing system 120 determines whether the recorded knowledge base version 142 for the content object 160a ... 160n is different from the current knowledge base version 142. If so, processing continues to block 314, otherwise, processing continues to block 306. Optionally, if the knowledge base versions 142 are different, the auditing system 120 may discover unwanted/unexpected content object 160a ... 160n changes or misplacements post automatic classification processing.

In certain embodiments, if the auditing system 120 finds that there is a different decision on a category for the same knowledge base version 142, assuming that the content repository 150a ... 150n and workflow 144 do not imply any changes to the content objects 160a ... 160n, the auditing system 120 may discover unlawful content object 160a ... 160n changes. For a regular usage of the content repositories 150a ... 150n, the audit procedure is meant to update the metadata 170a ... 170n, folder assignment, or check if there are incorrect/improper filed categorization or class assignment. During such a periodic audit process, the auditing system 120 may catch unexpected changes to the content objects 160a ... 160n, as well as, manual misplacements (i.e., post previous automatic classification processing).

Thus, the versioning feature may help the period audit procedure by: making it more efficient; discovering candidates of manual misplacement of content objects 160a ... 160n after the latest automatic classification procedure; and discovering candidates of unexpected (and unwanted) content changes.

Figure 4A:
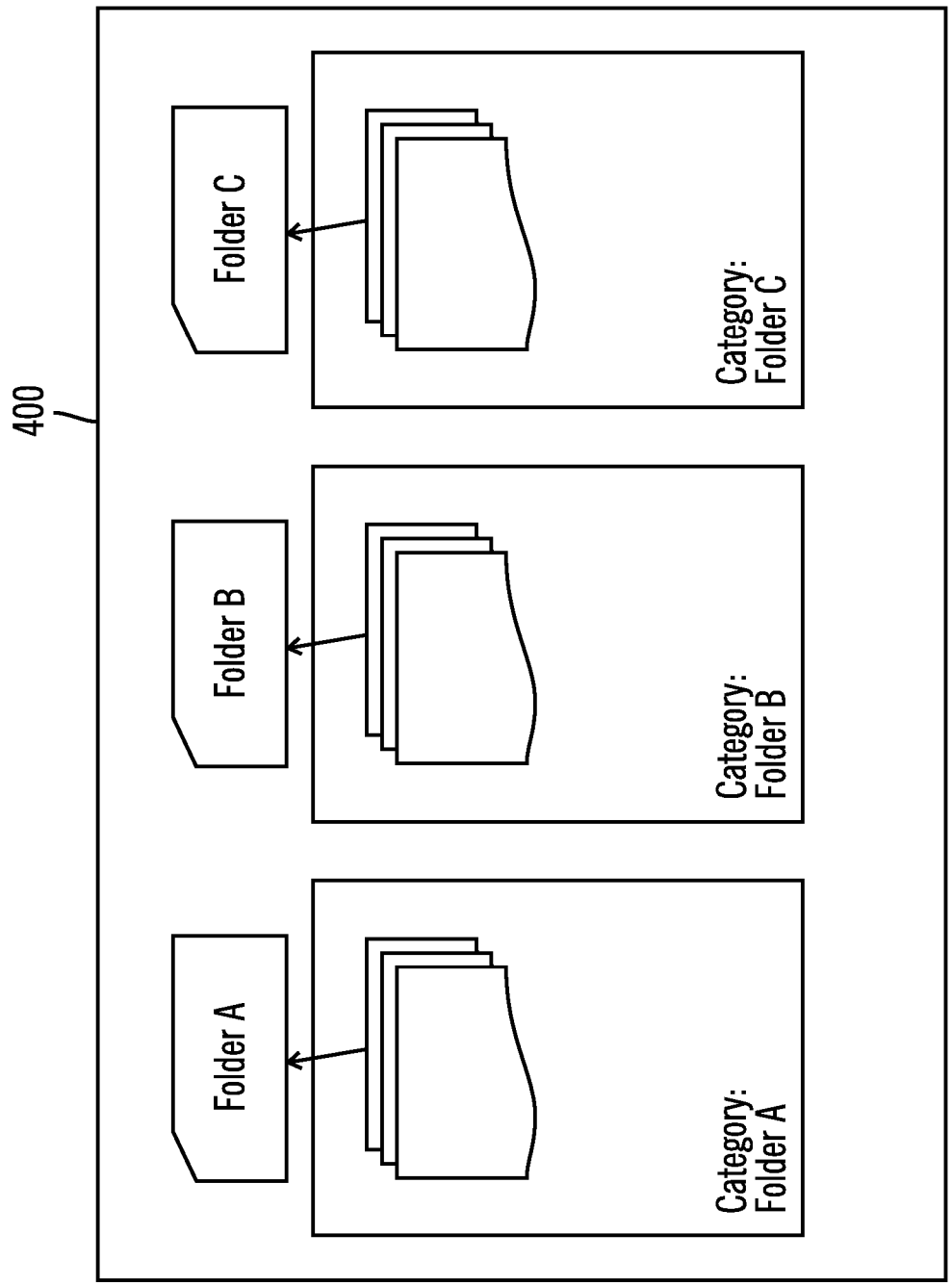
FIGS. 4A, 4B, and 4C illustrate, in block diagrams, an example of classification in accordance with certain embodiments.
Figure 4B:
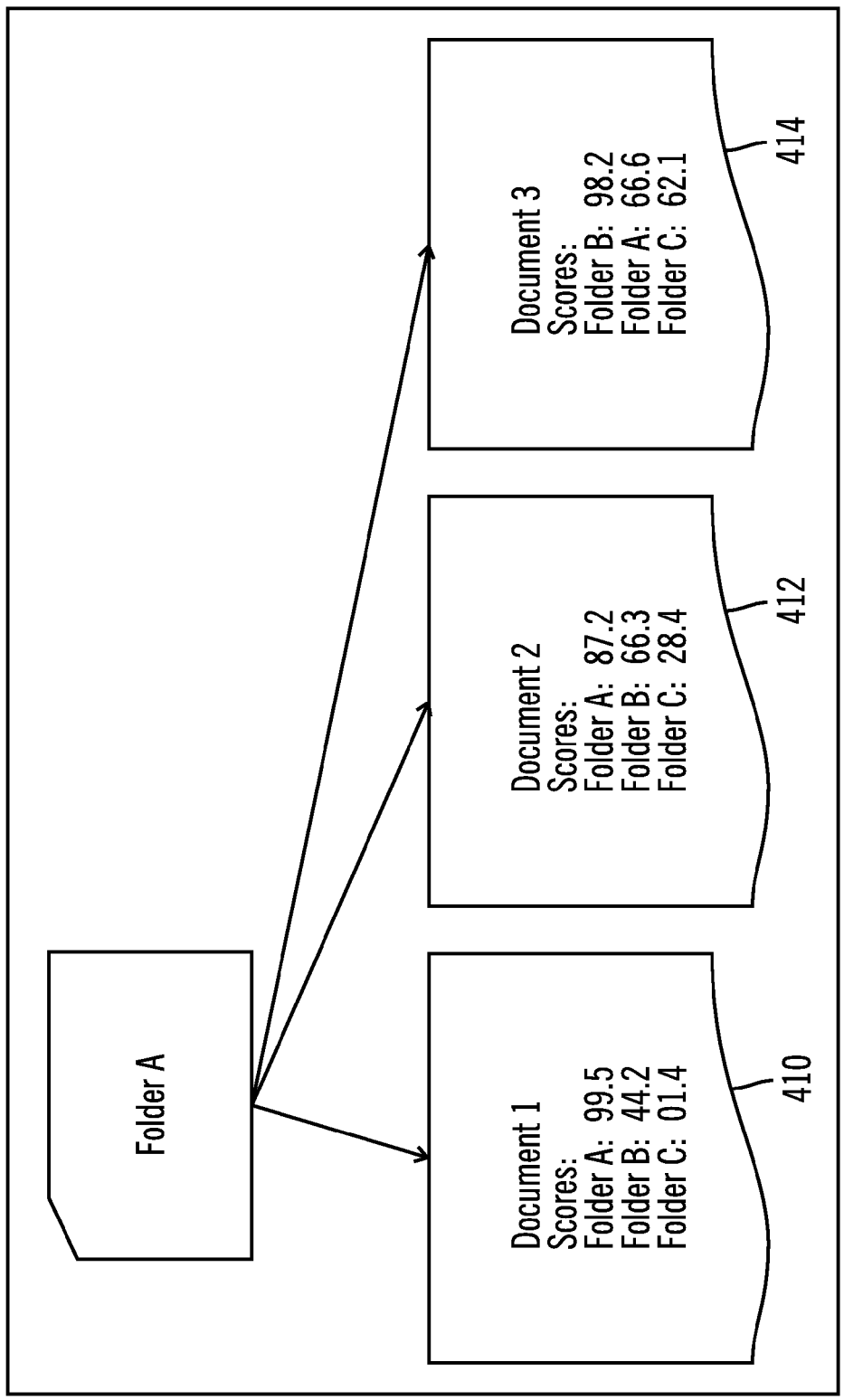
Figure 4C:
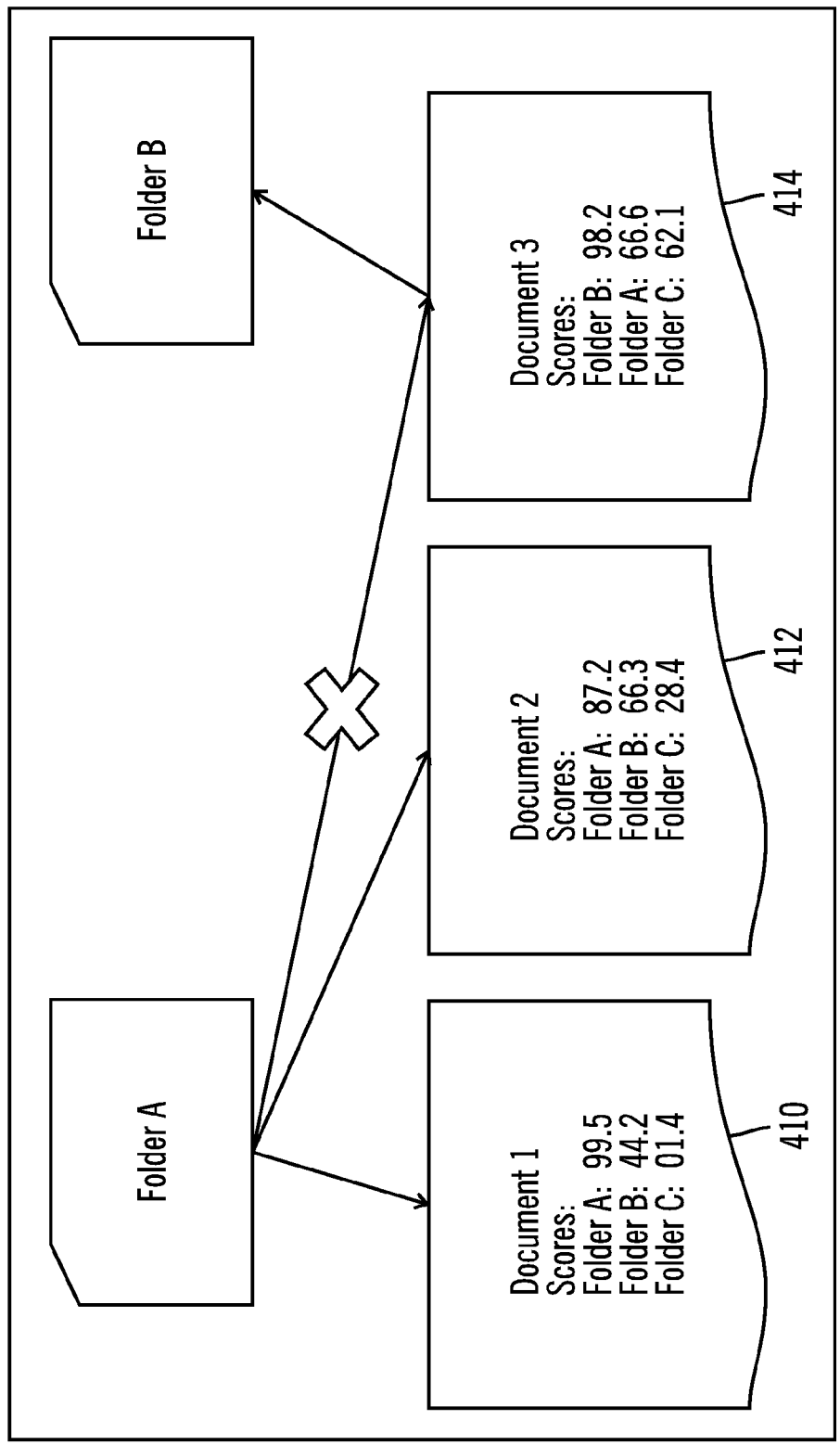

FIGS. 4A, 4B, and 4C illustrate, in block diagrams, an example of classification in accordance with certain embodiments. In FIG. 4A, the classification system 130 uses the documents in a folder to create a taxonomy 400 have three nodes: Category: Folder A; Category: Folder B; and Category: Folder C.

In FIG. 4B, for folder A, for each document 410, 412, 414, the classification system 130 generates a list of categories that have associated relevancy scores.

In FIG. 4C, the auditing system 120 takes the highest scoring category for each document and assigns that category to the document. In this example, the auditing system re-files document 3 414 to Category: Folder B.

Thus, the auditing system 120 uses statistical techniques to assign metadata and perform classification with greater and less subjective accuracy than humans. In this manner, the auditing system 120 provides more consistent and better categorization and metadata assignment.

In certain embodiments, before starting the audit process, a taxonomy 140 is created by: determining a metadata element to use as "category" (this could also be the location of content items within the content repository 150a . . . 150n (folder); obtaining a unique list of categories from the content repository 150a . . . 150n; and crawling the content repository 150a . . . 150n and using all of the content items in each category to create a knowledge base 142 (i.e., a statistical model) for classification.

Once the knowledge base 142 is created, the auditing system 120 selects a content object 160a . . . 160n and obtains the category that the content object 160a . . . 160n is currently assigned from the content repository 150a . . . 150n. In certain embodiments, the content object 160a . . . 160n that is selected first and the content objects 160a . . . 160n crawled have associated categories. In certain embodiments, a category may be a property of the content object 160a . . . 160n. In certain embodiments, a category may be either in the metadata or obtained from the content repository 150a . . . 150n.

The auditing system 120 sends the content object 160a . . . 160n to the classification system 130 and, in return, receives a list of matching categories and their relevance scores. The auditing system 120 determines whether or not the returned categories match the assigned category (e.g., based on either top scoring returned category or returned categories above a predetermined threshold). If there is a match, the content object 160a . . . 160n is determined to have been classified correctly and no action needs to be taken. If there is not a match, the content object 160a . . . 160n is reclassified. The reclassification may assign the content object 160a . . . 160n to one or more other categories (e.g., based on either top scoring returned category or returned categories above a predetermined threshold) or may create a new category if all scores are below a predetermined threshold and assign the content object 160a . . . 160n to the new category.

The auditing system 120 enables extraction from unstructured assets (e.g., any object in which text is freeform, narrative, or not in specific fields with finite values). The auditing system 120 extracts concepts from the unstructured assets of the data, leverages machine learning algorithms to help organize/discover data, and dynamically maintains the archived data by applying auditing, notification, and self learning capabilities. The auditing system 120 presents an auditor (e.g., a human) with the suggestions of the classification system 130 and with the option of interacting with the classification system 130 and changing the decisions or approving the decisions. The auditing system 120 ensures synchronizing the metadata/structure with changing business models and missions by periodically auditing the content objects 160a . . . 160n and updating metadata associated with those content objects 160a . . . 160n. Moreover, the auditing system 120 learns from the auditor's actions.

The auditing system 120 addresses misclassification or over time identification of content objects 160a . . . 160n that need metadata refreshed. This metadata may be properties or any type of metadata that can be associated with the content objects 160a . . . 160n inside the content repositories 150a . . . 150n. The auditing system 120 provides a periodic refresh of metadata (e.g., tagging) as the content organization changes over time and provides ways to identify which of the content objects 160a . . . 160n should change using knowledge base versioning.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 2 and FIG. 3 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 5:
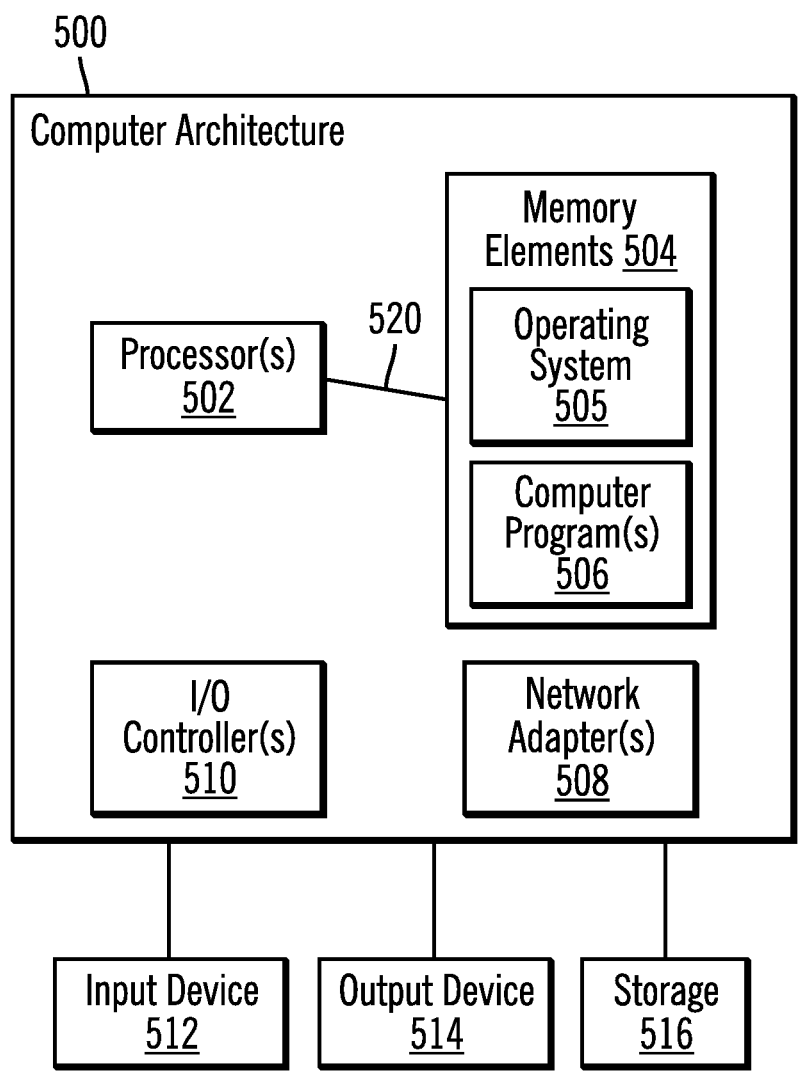
FIG. 5 illustrates, in a block diagram, a computer architecture that may be used in accordance with certain embodiments.

FIG. 5 illustrates a computer architecture 500 that may be used in accordance with certain embodiments. The server computer 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product for organizing content objects in an enterprise content management system, the computer program product comprising:
a non-transitory computer readable storage medium having computer readable program code embodied therein, wherein the computer readable program code, when executed by a processor of a computer, is configured to perform:
obtaining a first category that is currently assigned to a content object;
obtaining a list of candidate categories for the content object and relevancy scores for each of the candidate categories;
determining whether a name of the first category currently assigned to the content object is in the list of candidate categories for the content object by matching the name of the first category to a name of a candidate category;
in response to determining both 1) that the name of the first category is in the list of candidate categories and 2) that a relevancy score associated with the candidate category exceeds a threshold, identifying the content object as properly categorized; and
in response to determining that the first category does not match a candidate category in the list of candidate categories, identifying the content object as improperly categorized.

2. The computer program product of claim 1, wherein the computer readable program code, when executed by the processor of the computer, is configured to perform:
in response to determining that the content object is improperly categorized, automatically re-categorizing the content object by performing at least one of: enhancing metadata of the content object, moving the content object to a different category with content objects of similar context, and assigning the content object to a content object class that groups content objects of similar context.

3. The computer program product of claim 1, wherein the computer readable program code, when executed by the processor of the computer, is configured to perform:
providing the candidate categories that have associated relevancy scores that exceed the threshold in an audit report.

4. The computer program product of claim 1, wherein the computer readable program code, when executed by the processor of the computer, is configured to perform:
creating a taxonomy using metadata fields.

5. The computer program product of claim 1, wherein the computer readable program code, when executed by the processor of the computer, is configured to perform:
creating a knowledge base using a clustering technique that clusters content objects with common words.

6. The computer program product of claim 1, wherein the computer readable program code, when executed by the processor of the computer, is configured to perform:
determining whether a knowledge base version associated with the content object is different from a current knowledge base version; and
in response to determining that the knowledge base version is not different and that a decision to assign the content object to a different category has been made, discovering one of unwanted changes to the content object and misplacements of the content object post automatic classification processing.

7. The computer program product of claim 1, wherein the computer readable program code, when executed by the processor of the computer, is configured to perform:
  crawling the content objects to build a category profile for each category;
  producing a content object profile for each of the content objects; and
  generating relevancy scores for categories using the category profile for each category and the content object profile for each of the content objects.

8. A computer system for organizing content objects in an enterprise content management system, comprising:
  a processor; and
  a storage device coupled to the processor, wherein the storage device has stored thereon a program, and wherein the processor is configured to execute instructions of the program to perform operations, wherein the operations comprise:
    obtaining a first category that is currently assigned to a content object;
    obtaining a list of candidate categories for the content object and relevancy scores for each of the candidate categories;
    determining whether a name of the first category currently assigned to the content object is in the list of candidate categories for the content object by matching the name of the first category to a name of a candidate category;
    in response to determining both 1) that the name of the first category is in the list of candidate categories and 2) that a relevancy score associated with the candidate category exceeds a threshold, identifying the content object as properly categorized; and
    in response to determining that the first category does not match a candidate category in the list of candidate categories, identifying the content object as improperly categorized.

9. The computer system of claim 8, wherein the operations further comprise:
  in response to determining that the content object is improperly categorized, automatically re-categorizing the content object by performing at least one of: enhancing metadata of the content object, moving the content object to a different category with content objects of similar context, and assigning the content object to a content object class that groups content objects of similar context.

10. The computer system of claim 8, wherein the operations further comprise:
  providing the candidate categories that have associated relevancy scores that exceed the threshold in an audit report.

11. The computer system of claim 8, wherein the operations further comprise:
  creating a taxonomy using metadata fields.

12. The computer system of claim 8, wherein the operations further comprise:
  creating a knowledge base using a clustering technique that clusters content objects with common words.

13. The computer system of claim 8, wherein the operations further comprise:
  determining whether a knowledge base version associated with the content object is different from a current knowledge base version; and
  in response to determining that the knowledge base version is not different and that a decision to assign the content object to a different category has been made, discovering one of unwanted changes to the content object and misplacements of the content object post automatic classification processing.

14. The computer system of claim 8, wherein the operations further comprise:
  crawling the content objects to build a category profile for each category;
  producing a content object profile for each of the content objects; and
  generating relevancy scores for categories using the category profile for each category and the content object profile for each of the content objects.

* * * * *